United States Patent
DeJong

(10) Patent No.: US 10,323,906 B2
(45) Date of Patent: Jun. 18, 2019

(54) AUTONOMOUS FLIGHT TERMINATION SYSTEM AND METHOD

(71) Applicant: The Boeing Company, Chicago, IL (US)

(72) Inventor: Michelle V. DeJong, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 267 days.

(21) Appl. No.: 15/281,608

(22) Filed: Sep. 30, 2016

(65) Prior Publication Data

US 2018/0094903 A1   Apr. 5, 2018

(51) Int. Cl.

| *F41G 7/34* | (2006.01) |
|---|---|
| *F42B 15/01* | (2006.01) |
| *F42B 33/06* | (2006.01) |
| *B64D 1/04* | (2006.01) |

(52) U.S. Cl.
CPC .............. *F41G 7/346* (2013.01); *F42B 15/01* (2013.01); *F42B 33/06* (2013.01); *B64D 1/04* (2013.01)

(58) Field of Classification Search
CPC .. B64G 1/005; B64G 3/00; F41G 7/00; F41G 7/346; F41G 9/00; F42B 15/01
See application file for complete search history.

(56) References Cited

U.S. PATENT DOCUMENTS

| 2,984,435 | A | * | 5/1961 | Faith | .......... | F41G 7/36 |
|---|---|---|---|---|---|---|
| | | | | | | 244/175 |
| 4,007,688 | A | * | 2/1977 | Franz | .......... | F42B 8/24 |
| | | | | | | 102/378 |
| 5,739,787 | A | * | 4/1998 | Burke | .......... | F41G 7/006 |
| | | | | | | 244/3.2 |
| 6,122,572 | A | * | 9/2000 | Yavnai | .......... | G05D 1/0088 |
| | | | | | | 342/13 |
| 6,896,220 | B2 | * | 5/2005 | McKendree | .......... | F41G 7/007 |
| | | | | | | 244/3.15 |
| 8,868,258 | B2 | * | 10/2014 | Papadopoulos | .......... | B64G 1/002 |
| | | | | | | 701/3 |

(Continued)

OTHER PUBLICATIONS

Cherry, Jeffrey et al.; "Discussion Slides for the Core Autonomous Safety Software (CASS)"; pp. 1-19; (Aug. 11, 2014).

(Continued)

*Primary Examiner* — Benjamin P Lee
(74) *Attorney, Agent, or Firm* — Vivacqua Law

(57) ABSTRACT

An autonomous flight termination system for terminating vehicle flight after the vehicle is launched from an aircraft includes a global positioning system (GPS) receiver; a termination unit selected from a cut-off switch connected to terminate vehicle flight when actuated, and a switch connected to detonate an explosive on the vehicle; a system controller for receiving a first signal indicating separation of the vehicle from the aircraft and a second signal from the GPS receiver to calculate an actual vehicle trajectory, and for sending a third signal to actuate the termination unit to terminate the flight of the vehicle when the actual vehicle trajectory is determined to be outside the safety bounds of a mission-planned flight trajectory; and a failsafe controller connected to receive operational data of the system controller, and to actuate the termination unit when the operational data indicates that the system is in an error state.

20 Claims, 3 Drawing Sheets

(56) References Cited

U.S. PATENT DOCUMENTS

| | | | | |
|---|---|---|---|---|
| 9,429,403 B2* | 8/2016 | Papadopoulos | ........ | B64G 1/002 |
| 2004/0245369 A1* | 12/2004 | McKendree | ............ | F41G 7/007 |
| | | | | 244/3.15 |
| 2010/0057285 A1* | 3/2010 | Murphy | ................ | F42B 12/365 |
| | | | | 701/23 |
| 2012/0048993 A1* | 3/2012 | Velez | ..................... | F42B 10/16 |
| | | | | 244/3.28 |
| 2014/0067164 A1* | 3/2014 | Papadopoulos | ........ | B64G 1/002 |
| | | | | 701/3 |
| 2014/0330457 A1* | 11/2014 | Papadopoulos | ........ | B64G 1/002 |
| | | | | 701/3 |
| 2017/0328678 A1* | 11/2017 | Burke | ........................ | F41G 3/04 |
| 2018/0362158 A1* | 12/2018 | Zhang | ................... | B64C 39/024 |

OTHER PUBLICATIONS

Radar Physics Laboratory; "Flight Termination System"; System Planning Corporation; http://www.sysplan.com/capabilities/radar/fts/; pp. 1-2 (first published at least as early as Dec. 29, 2015).

* cited by examiner

AUTONOMOUS FLIGHT TERMINATION SYSTEM AND METHOD

STATEMENT OF GOVERNMENT RIGHTS

This invention was made with Government support under HR0011-14-C-0051 awarded by Defense Advanced Research Projects Agency. The government has certain rights in this invention.

TECHNICAL FIELD

The present disclosure relates to aircraft flight control systems and, more particularly, to autonomous flight termination systems and methods for terminating flight of a vehicle after launch.

BACKGROUND

Space agencies have developed airborne launch assist space access (ALASA) systems for launching small satellites or other unmanned vehicles into low Earth orbit (LEO) using an expendable rocket dropped from a conventional aircraft. For example, a jet aircraft, such as an Air Force F-15, may act as a reusable "first stage" to carry a two-stage, liquid-fueled launch vehicle aloft to an altitude of 100,000 feet above sea level. The launch vehicle may include a payload mounted on a second stage which, in turn, is mounted on a first stage that is attached to the underbelly of the conventional jet aircraft. The launch vehicle may be separated from the jet aircraft and the first stage ignited. The launch vehicle then may follow a predetermined upward trajectory until the first stage flames out, which may be at approximately 200,000 feet, at which point the second stage may carry the payload, which may be an unmanned satellite, to a predetermined LEO.

Systems have been developed for monitoring the trajectory of such launch vehicles once they have been separated from the conventional jet aircraft that has carried them aloft. Such systems frequently employ ground stations that communicate with the launch vehicle by known telemetry systems. The ground stations require operation by human personnel to follow the trajectory of the vehicle, monitor the functioning of on-board guidance systems, and make a determination on whether the launch vehicle flight should be terminated based on telemetry received from the launch vehicle.

A goal of such ALASA LEO satellite launch systems is cost reduction. One means of minimizing launch costs of such systems is to eliminate the need for human operators. Such a system would minimize the costs of operation, and would provide flexibility in the selection of the launch area and deployment of the launch vehicle.

SUMMARY

The present disclosure describes an autonomous flight termination system and method that is entirely self-contained and may be mounted on a launch vehicle such as a multi-stage, liquid-fueled launch vehicle. The autonomous flight termination system and method has an advantage over prior systems in that it eliminates the need for human intervention, known as "man-in-the-loop," in making a decision on whether to terminate the flight of the launch vehicle from a remote location. A further advantage is that the disclosed autonomous flight termination system and method are sufficiently robust and reliable to eliminate the need for a duplicate, redundant onboard unit.

In an embodiment, an autonomous flight termination system for terminating a vehicle flight after the vehicle is launched from an aircraft includes a first global positioning system (GPS) receiver for determining a position of the vehicle during the vehicle flight relative to the Earth; a first termination unit selected from a first cut-off switch connected to terminate the vehicle flight when actuated, and a first switch connected to detonate an explosive on the vehicle; a system controller for receiving a first signal from the aircraft indicating separation of the vehicle from the aircraft and a second signal from the first GPS receiver to calculate an actual vehicle trajectory, and for sending a third signal to actuate the first termination unit to terminate the flight of the vehicle when the actual vehicle trajectory is determined by the system controller to be outside predetermined safety bounds of a mission-planned flight trajectory for the vehicle; and a failsafe controller connected to receive operational data of the system controller and connected to actuate the first termination unit to terminate the vehicle flight when the operational data indicates that the system controller is in an error state.

In another embodiment, a vehicle adapted to be launched from an aircraft includes an engine; a first autonomous flight termination system for terminating a flight of the vehicle after the vehicle is launched from an aircraft, the autonomous flight termination system including a first GPS receiver for determining a position of the vehicle during the vehicle flight relative to the Earth; a first termination unit selected from a first cut-off switch connected to terminate the vehicle flight when actuated, and a first switch connected to an explosive on the vehicle; a system controller for receiving a first signal from the aircraft indicating separation of the vehicle from the aircraft and a second signal from the GPS receiver to calculate an actual vehicle trajectory, and for sending a third signal to actuate the first termination unit to terminate the flight of the vehicle when the actual vehicle trajectory is determined by the system controller to be outside safety bounds of a mission-planned flight trajectory for the vehicle; and a failsafe controller connected to receive operational data of the system controller, the failsafe controller connected to actuate the first termination unit to terminate the vehicle flight when the operational data indicates that the system controller is in an error state.

In yet another embodiment, a method for terminating a vehicle flight after the vehicle is launched from an aircraft includes determining a position of the vehicle during the vehicle flight relative to the Earth with a GPS receiver; receiving by a system controller a first signal from the aircraft indicating separation of the vehicle from the aircraft and a second signal from the GPS receiver, calculating an actual vehicle trajectory, and determining whether the actual vehicle trajectory is outside predetermined safety bounds of a mission planned flight trajectory for the vehicle; receiving operational data of the system controller by a failsafe controller to determine whether the system controller is in an error state; and terminating the flight of the vehicle either by the system controller actuating a termination unit in response to the actual vehicle trajectory determined by the system controller to be outside the predetermined safety bounds, or by a failsafe controller actuating the termination unit in response to the operational data indicating that the system controller is in an error state.

Other objects and advantages of the disclosed autonomous flight termination system and method will be apparent from the following description, the accompanying drawings, and the appended claims.

DETAILED DESCRIPTION

Figure 1:
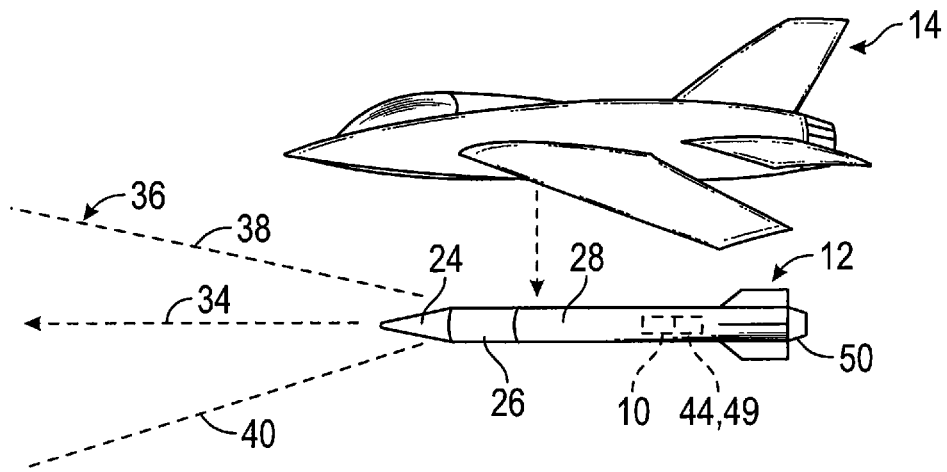
FIG. 1 is a schematic representation of the disclosed autonomous flight termination system mounted on a multi-stage launch vehicle that has been separated from the jet aircraft that has carried the launch vehicle aloft.
Figure 2:
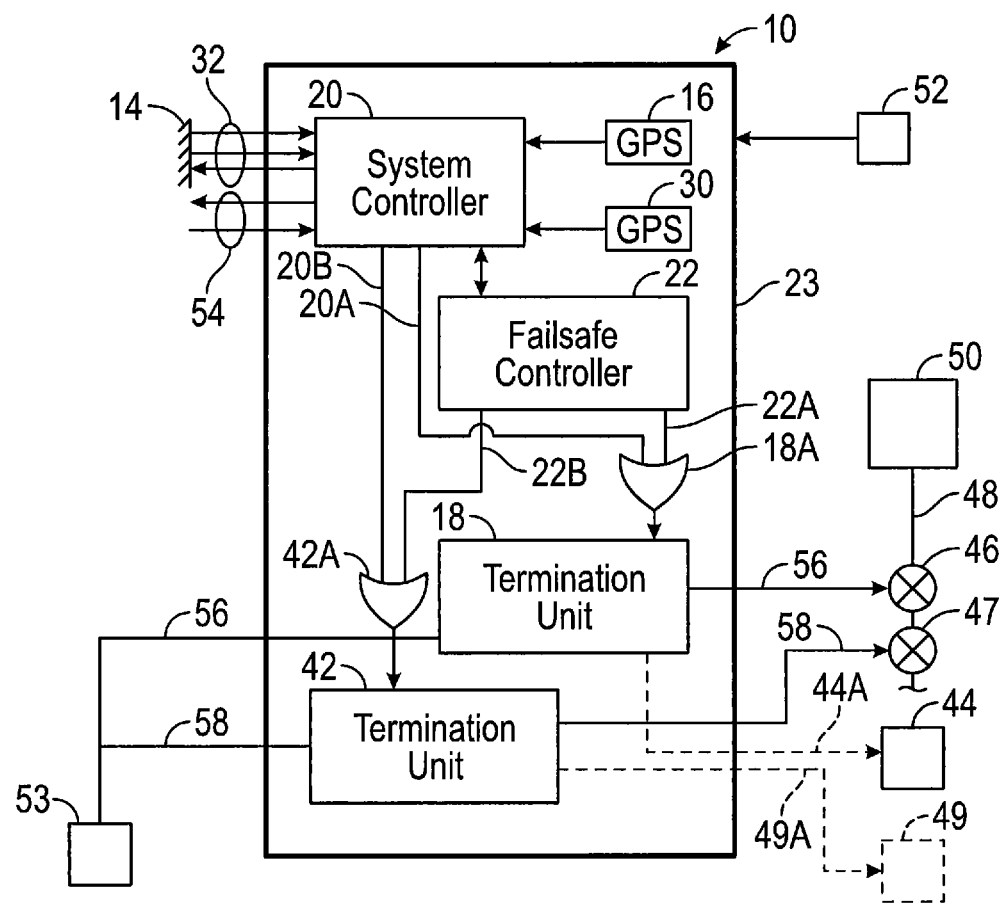
FIG. 2 is a schematic representation of the disclosed autonomous flight termination system shown in FIG. 1.

As shown in FIGS. 1 and 2, an autonomous flight termination system, generally designated 10, for terminating a vehicle flight after the vehicle 12 is launched from an aircraft 14, may include a first global positioning system (GPS) receiver 16, a first vehicle flight termination unit 18, a system controller 20, and a failsafe controller 22. The flight termination system 10 in its entirety may be mounted on board the vehicle 12, which in embodiments may be a two-stage, liquid-fueled launch vehicle. Some or all of the system controller 20, failsafe controller 22, vehicle flight termination unit 18, and GPS receiver may be mounted on a circuit card in an avionics box 23.

The aircraft 14 may be any type of aircraft capable of carrying the vehicle 12 aloft. In embodiments, the aircraft 14 may take the form of a jet aircraft, such as an F-15, and in other embodiments may take the form of propeller-driven or other fixed-wing aircraft, a helicopter, a lighter-than-air aircraft, or a spacecraft. In a particular embodiment, the aircraft 14 may be an unmodified F-15E aircraft, using existing infrastructure that provides rapid response and low cost. In an embodiment in which the vehicle 12 takes the form of a two-stage liquid-fueled launch vehicle, the vehicle may include a payload 24, such as an LEO satellite, mounted on a second stage 26 that, in turn, is mounted on a first stage or booster 28. The system 10 may be mounted entirely within the first stage 28, or in embodiments may be mounted wholly or partially within one or more of the second stage 26 and the payload 24.

The first GPS receiver 16 may be configured to determine a position of the vehicle 12 during vehicle flight relative to the Earth. The GPS receiver 16 may provide position data continuously to the system controller 20 during flight of the vehicle 12, which is used by the system controller 20 to calculate the actual vehicle flight trajectory. In an embodiment, the system 10 may include a second or redundant GPS receiver 30, which may be mounted on a circuit card in avionics box 23, also may provide position data to the system controller 20.

The system controller 20 may be connected via hardline separation switches or a link 32, which in an embodiment may take the form of a MIL-STD 1760 interface as part of an umbilical, to receive a first signal from the aircraft 14 that indicates separation of the vehicle 12 from the aircraft. Prior to separation of the vehicle 12 from the aircraft 14, the system controller also may receive data indicative of an initial position of the vehicle from the aircraft, which may be from a GPS receiver (not shown) mounted on the aircraft. Receipt of this position data may be necessary because the aircraft 14 may block the reception of satellite signals by the GPS receivers 16, 30 on the vehicle 12. The system controller 20, which may be configured to receive a second signal indicative of position data from first and second GPS receivers 16, 30 to calculate an actual vehicle trajectory 34 relative to the Earth, also may include a stored, predetermined mission-planned flight trajectory, generally designated 36, having predetermined safety limits or safety bounds 38, 40 for the vehicle 12.

Figure 3:
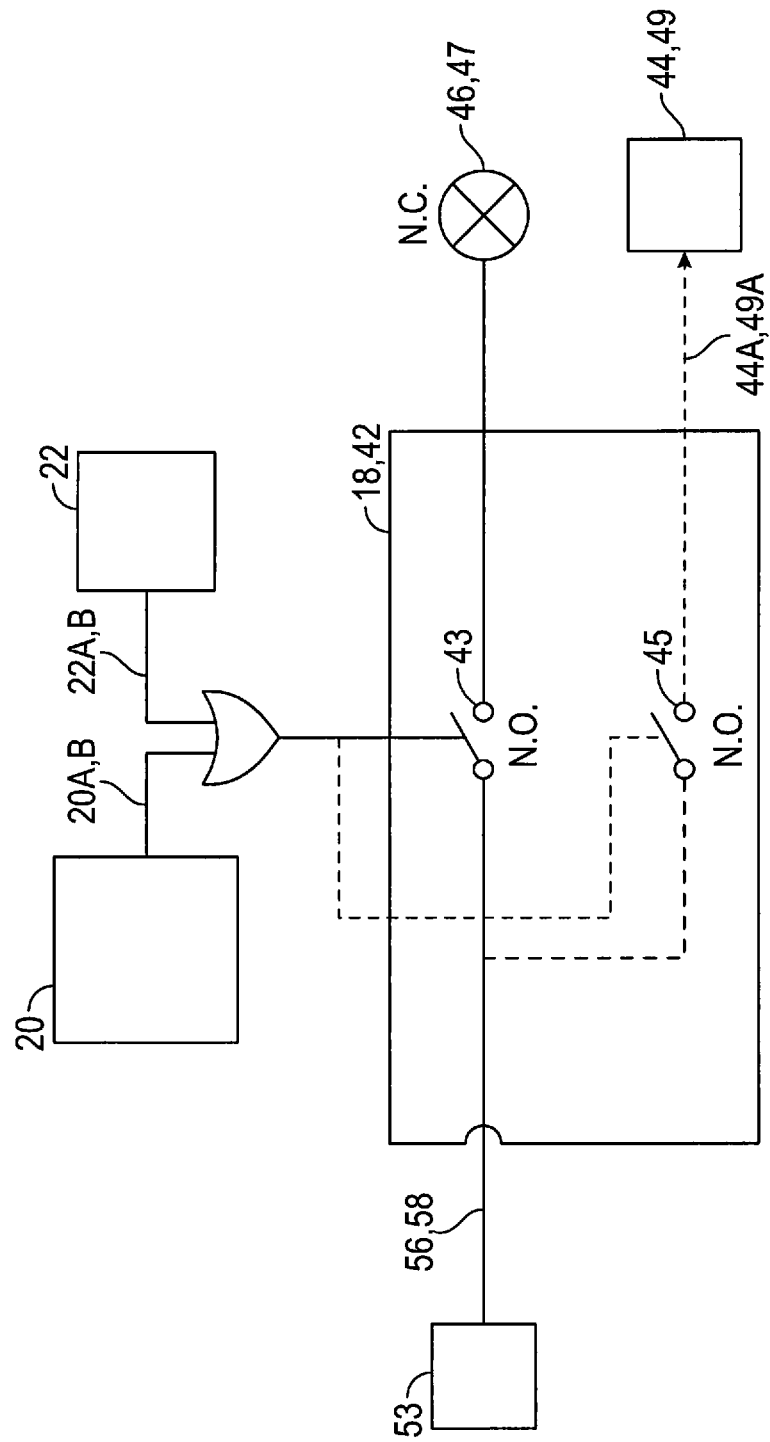
FIG. 3 is a schematic representation of an exemplary termination unit of FIG. 2.

The system 10 optionally may include a redundant or second termination unit 42 in addition to first termination unit 18. Termination units 18, 42 may be connected to receive termination signals from the system controller 20 over signal paths or connections 20A and 20B. As shown in FIG. 3, in embodiments, the termination units 18, 42 each may include, or consist of, a normally open cut-off switch 43 connected to terminate the vehicle flight when actuated, and/or a normally open switch 45 connected to detonate an explosive 44 mounted on the vehicle 12, which may be selected to destroy all of the vehicle, or a portion of the vehicle, or first stage booster 28 essential for continued flight. Optionally, as shown in FIGS. 2 and 3, the system 10 may include a second or redundant explosive 49. The system controller 20 may be connected to the termination units 18, 42 to send a third signal to actuate the termination units to terminate the flight of the vehicle 12 when the actual vehicle trajectory 34 is determined by the system controller to be outside the safety bounds 38, 40 of the mission-planned flight trajectory 36 for the vehicle.

In embodiments, the cut-off switches 43 of the termination units 18, 42 may take the form of normally open relays such that a loss of power to the system 10 from flight termination power source 52 causes the relays to open and create a terminate condition. In an embodiment, the cut-off switches 43 of the termination units 18, 42 may be connected to normally closed valves 46, 47, respectively, mounted in series on a fuel supply line 48 connected to the power plant or engine 50 of the vehicle 14. In an embodiment, the engine 50 may take the form of a booster for the first stage 28 of the vehicle 12. In an embodiment, the system controller 20 may be connected to the cut-off switches 43 of the termination units 18, 42 so that actuation of the termination units by the third signal may include de-energizing the cut-off switches to their normally open states, which in turn closes the valves 46, 47 to shut off fuel flow through fuel line 48 to engine 50.

The termination units 18, 42, which may receive electrical power from a flight termination battery or other source 52 of electric power onboard the vehicle 12, may energize the normally open cut-off switches 43 to closed positions, which, as shown in FIG. 3 (showing switches 43 open) allows the valves 46, 47 to be energized by vehicle battery 53 or other power source 52 to open configurations beginning at vehicle launch. The valves 46, 47 remain energized—and thereby open—by vehicle battery 53 continuously during flight of the vehicle, or in embodiments, during burn of the first stage booster 28. In an embodiment (see also FIG. 2), the valves 46, 47 may receive electrical power from vehicle battery 53 over electrical power lines 56, 58 and through termination units 18, 42, respectively, and energize and maintain the valves to their open positions and thereby permit fuel flow through supply 48 to engine 50 continuously during flight of the vehicle 12 along the mission-planned trajectory, or during burn of the first stage booster 28.

In the event that electric power from sources 52, 53 fails or is purposely removed, or one or both termination units 18, 42 is de-energized by system controller 20 or failsafe controller 22, the cut-off switches 43 of the termination units to open, thereby cutting electric current to the valves 46, 47, causing them to close. This shuts off fuel flow through fuel line 48 to the engine 50 and terminates the flight of vehicle 12 or first stage 28.

The system controller 20 may actuate (i.e., open) the cut-off switches 43 of the termination units to de-energize the valves 46, 47, respectively, in the event that the system controller determines the actual flight trajectory 34 to be outside the safety bounds 38, 40 of the mission-planned flight trajectory 36 of the vehicle 12. Either or both of the valves 46, 47, when closed, stops the flow of fuel through fuel supply line 48 and thereby starves the engine 50 of fuel, causing the vehicle 12 to lose altitude and crash into a predetermined safe area, such as an unpopulated land area or an unoccupied expanse of ocean.

The failsafe controller 22 of the system 10 may be connected to the system controller 20 to receive operational data of the system controller. The failsafe controller 22 may be connected to the termination unit 18 by signal path or connection 22A, and in embodiments to the redundant termination unit 42, by signal path or connection 22B. In an embodiment, the signal paths or connections 20A and 22A from system controller 20 and failsafe controller 22, respectively, may be connected to the input of an OR logic gate 18A that is connected to, or incorporated in, the normally open cut-off switch 43 and/or normally open switch 45 of termination unit 18. Similarly, the signal paths or connections 20B and 22B from system controller 20 and failsafe controller 22, respectively, may be connected to the input of an OR logic gate 42A that is connected to, or incorporated in, the normally open cut-off switch 43 of termination unit 42.

The failsafe controller 22 may send a signal to the termination units 18, 42 to actuate (i.e., de-energize) their respective cut-off switches 43 to their normally open positions, thereby cutting electric power to valves 46, 47, respectively, which closes the valves to cut fuel flow to the engine 50, thus terminating vehicle flight when the operational data received from the system controller 20 indicates that the system controller 20 is in an error state.

As indicated in FIG. 2, the termination unit 18, and redundant termination unit 42, may be connected through OR logic gates 18A, 42A, respectively, to the system controller 20 and failsafe controller 22 so that a termination signal received from either the system controller or the failsafe controller will actuate the termination unit 18, and optionally termination unit 42, to terminate flight of the vehicle 12. As discussed previously, additionally, or alternatively, termination of vehicle flight may take the form of shutting off fuel flow through the fuel supply line 48 to the engine 50.

Optionally, or in addition, termination unit 18 may be connected to an arm/fire explosive device 44 by signal path or connection 44A, and termination unit 42 may be connected to an optional arm/fire explosive device 49 by signal path or connection 49A. The switches 45 of termination units 18, 42 (see FIG. 3) may be normally open switches connected to or incorporating the OR logic gates 18A, 42A. The system 10 may abruptly terminate flight of the vehicle 12, or of booster stage 28, by actuating switches 45 contained in one or both of the termination units 18, 42 to break electric current from lines 56, 58 that detonate one or both explosives 44, 49 mounted on the vehicle 12 that destroys all or a portion of the vehicle essential to flight, such as the booster stage 28.

In embodiments, the error state detected by the failsafe controller 22 may include one or more of a clock failure in the system controller 20, a loss of power to the system 10 and therefore to the system controller, a system controller hardware failure, and a system controller software failure. In other embodiments, the error state may include one of the foregoing, all of the foregoing, or a subset of one or more of the foregoing.

In still other embodiments, the failsafe controller 22 may consist of, or include, a "watchdog" function that may take the form of a software watchdog timer. That is, the failsafe controller 22 may include a time-out clock that must be periodically reset by a signal from the system controller 20. In the event that the system controller 20 does not reset the time-out clock of the failsafe controller 22, the failsafe controller 22 will send a termination signal to termination unit 18, and optionally termination unit 42, thereby actuating the termination units to terminate the flight of the vehicle 12 by closing valves 46, 47 and/or detonating explosive 44. In embodiments, the watchdog function of the failsafe controller 22 is that of a software watchdog timer.

In embodiments, the system controller 20 may be connected to the aircraft 14 by an interface 32 that may include break wires. Further, the system controller 20 may be connected to the aircraft 14 by additional connections 54 that may transmit telemetry data. The telemetry connections 54 may instead be directed to a ground system (not shown) in addition to or instead of to the aircraft 14. The system controller 20 may be programmed to introduce a delay in the actuation of the cut-off switches of the termination unit 18 and termination unit 42 until after launch of the vehicle 12 from the aircraft 14. The delay may be for a predetermined time interval, for example four seconds.

Figure 4:
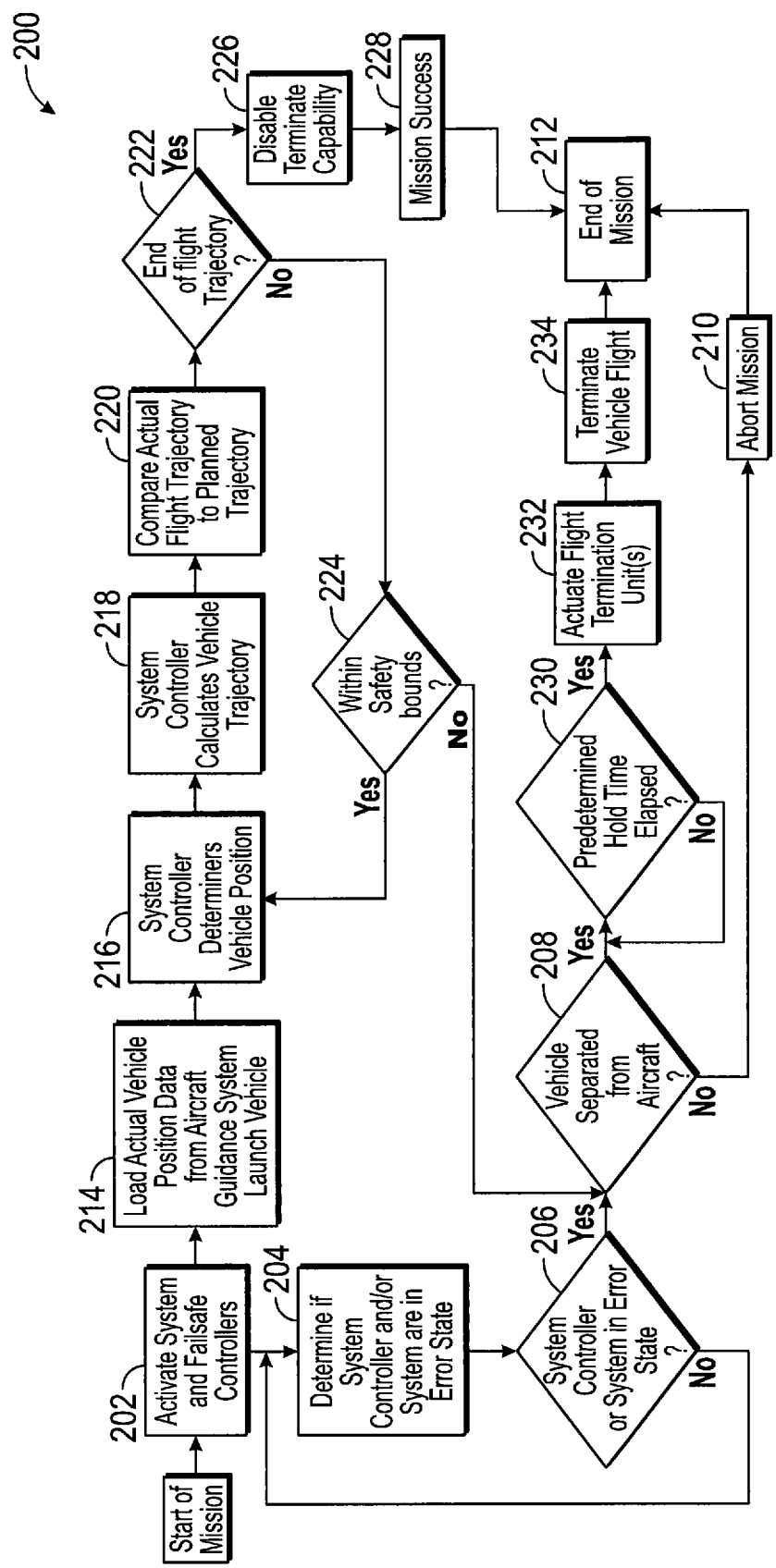
FIG. 4 is a flow chart showing the disclosed autonomous flight termination method embodied in the systems shown in FIGS. 1, 2, and 3.

As shown in FIG. 4, a method for autonomous flight termination, generally designated 200, may incorporate the termination system 10 illustrated in FIGS. 1, 2, and 3 described above. The vehicle 12 initially may be attached to a pod the underside of the aircraft 14, and the hardline switches or link 32 and telemetry connections 54 between the aircraft and vehicle established and verified. The aircraft 14 with the vehicle 12 then takes off and reaches a predetermined altitude and location. The method 200 may begin with the pilot and/or range safety officers activating the system controller 20 and failsafe controller 22, as indicated in block 202. This activation may occur when the aircraft 14 has reached the predetermined altitude and location, or before.

As indicated in block 204, the system controller 20 and failsafe controller 22 perform self-tests to determine whether either is in an error state. The error state may result from a hardware failure, a clock failure, a software failure, or a power failure in the system controller 20 and/or the failsafe controller 22. As indicated in decision diamond 206, if either the system controller 20 or failsafe controller 22 is in an error state, then as indicated in decision diamond 208, if the vehicle 12 is not separated from the aircraft 14 at that time, the mission is aborted, as indicated in block 210, and the mission ends, as indicated in block 212. In this situation, the pilot and/or range safety officers may receive an abort signal from the system 10 through link 32. The vehicle 12 is not launched from the aircraft 14, and the aircraft returns to base.

As indicated in decision diamond 206, if neither the system controller 20 nor the failsafe controller 22 is in an error state, the system 10 does not send an abort signal to the pilot and/or range safety officers, vehicle position data may be loaded from the aircraft 14 over link 32 to the system controller 20, and the vehicle is launched or separated from the aircraft, as indicated in block 214. Also included in block 214, in an embodiment, the system controller 20 and/or failsafe controller 22 are programmed not to actuate the termination units 18, 42 for a predetermined hold time, such as four minutes, to allow the aircraft 14 to reach a safe distance from the vehicle 12. Once the vehicle 12 separates from the aircraft 14 and the umbilical, which may include link 32 and/or telemetry connection 54, disconnects, the onboard GPS receivers 16, 30 will be the only sources of position data to the system controller 20, which determines vehicle position, as indicated in block 216, and throughout the mission.

As indicated in block 218, from this initial position data received from the airplane 14 and the position data from GPS receivers 16, 30, the system controller 20 calculates the actual trajectory 34 of the vehicle 12. The system controller 20 compares the actual trajectory 34 with the planned flight trajectory, as indicated in block 220. As indicated in decision diamond 222, if the vehicle has not reached the end of its planned flight trajectory, then, as indicated in decision diamond 224, the system controller 20 determines whether the vehicle 12 is within safety bounds 36. If it is, then the system controller 20 continues to determine vehicle position, calculate actual flight trajectory 34, and compare it to the planned flight trajectory, as shown in blocks 216, 218, and 220, and decision diamonds 222 and 224.

If the end of the planned flight trajectory, which in an embodiment may be when the first stage booster 28 has burned out, is reached, then, as indicated in decision diamond 222 and block 226, the system controller 20 inhibits the termination units 18, 42, such that they will no longer be capable of terminating the flight, and a mission success condition is achieved, as indicated in block 228, marking the end of mission indicated in block 212.

Referring to decision diamond 224, if during the mission the vehicle 12 flies outside the safety bounds 36 of the planned trajectory, then, if provided that the vehicle is separated from the aircraft (diamond 208) and the predetermined hold time has elapsed, as indicated in diamond 230, the system controller 20 actuates the termination units 18, 42, as indicated in block 232. As indicated in diamond 230, if the predetermined hold time has not elapsed, but the vehicle 12 has been launched (diamond 208), then the system 10 waits until the hold time or time delay has elapsed. The system controller 20 actuates one or both of the termination units 18, 42, which then proceeds to terminate vehicle flight, as indicated in block 234, by closing one or both valves 46, 47 on fuel line 48 and/or detonating one or both explosives 44, 49. The vehicle 12 then falls to Earth (or into the ocean) and the mission ends, as indicated in block 212.

Alternatively, or in addition, the failsafe controller 22 may include a software watchdog timer that must receive a signal from the system controller 20 to reset itself periodically throughout the course of the launch and flight of the launch vehicle 12 or first stage booster 28 along the trajectory 34, in embodiments at least until the first stage booster separates from the remainder of the vehicle, namely the second stage 26 and the payload 24. This function may be included in block 204.

If that watchdog software timer of the failsafe controller 22 is permitted to time out, for example, if the failsafe controller does not receive a restart command from the system controller 20 in time, then, if the vehicle 12 is separated from the aircraft 14 (diamond 208) and the predetermined hold time has elapsed (block 230), failsafe controller 22 may send a termination signal to one or both of the termination units 18, 42, as indicated by block 232, which will result in termination of the vehicle flight as indicated by block 234, in a manner or manners previously discussed.

The foregoing system 10 and method 200 provide autonomous, compact, robust, and low-cost solutions to a flight termination system that may be mounted on board the launch vehicle to be monitored. This system also may provide internal redundancies that eliminate the need for additional or redundant flight termination systems to be employed for a vehicle. Failure of power to the system, or failure of a termination unit, will not inhibit the termination function of the system. Further, the flight termination method and system disclosed herein eliminate the need for human intervention in determining whether to terminate the flight of a launched vehicle, thereby providing a low cost system over human operated systems, and eliminating the need for expensive telemetry and ground-based equipment.

While the system and method herein described constitute preferred embodiments of the disclosed autonomous flight termination system and method, it is to be understood that the disclosure is not limited to these precise forms of apparatus and methods, and that changes may be made therein without departing from the scope of the disclosure.

What is claimed is:

1. An autonomous flight termination system for terminating a vehicle flight after the vehicle is launched from an aircraft, the system comprising:
   a first global positioning system (GPS) receiver for determining a position of the vehicle during the vehicle flight relative to the Earth;
   a first termination unit selected from a first cut-off switch connected to terminate the vehicle flight when actuated, and a first switch connected to detonate an explosive on the vehicle;
   a system controller for receiving a first signal from the aircraft indicating separation of the vehicle from the aircraft and a second signal from the first GPS receiver to calculate an actual vehicle trajectory, and for sending a third signal to actuate the first termination unit to terminate the flight of the vehicle in response to determining the actual vehicle trajectory is outside predetermined safety bounds of a mission-planned flight trajectory for the vehicle; and
   a failsafe controller connected to receive operational data of the system controller and connected to actuate the first termination unit to terminate the vehicle flight in response to the operational data indicating the system controller is in the error state.

2. The system of claim 1, wherein the cut-off switch of the first termination unit includes a first normally open terminate relay such that a loss of power to the system causes the first normally open relay to open and issue a terminate command.

3. The system of claim 2, wherein the first normally open terminate relay is connected on a line providing electric power to energize a first normally closed valve in a fuel supply line of an engine of the vehicle, and the system controller and the failsafe controller are connected to the first termination unit to actuate the terminate relay to open, which de-energizes and thereby closes the valve.

4. The system of claim 1, wherein the error state includes one or more of a system controller clock failure, a loss of power to the system, a system controller hardware failure, and a system controller software failure.

5. The system of claim 1, wherein the first cut-off switch is actuated to terminate the vehicle flight either when the actual vehicle trajectory is determined by the system controller to be outside the safety bounds of a mission planned flight trajectory for the vehicle, or when the failsafe controller receives the operational data indicating that the system is in the error state.

6. The system of claim 1, wherein the first cut-off switch cuts off fuel flow to a power plant of the vehicle when actuated.

7. The system of claim 1, wherein the first switch detonates an explosive mounted on the vehicle when actuated.

8. The system of claim 1, further comprising one of hardline separation switches or a link to receive the first signal from the aircraft indicating separation of the vehicle from the aircraft.

9. The system of claim 1, wherein the failsafe controller includes a software watchdog timer.

10. The system of claim 1, wherein the first cut-off switch actuates a fuel cut-off valve mounted on the vehicle.

11. The system of claim 1, further comprising a second global positioning system connected to the system controller.

12. The system of claim 1, further comprising a second termination unit including a second cut-off switch connected to terminate the vehicle flight when actuated.

13. The system of claim 1, wherein the system controller is programmed to delay actuation of the first cut-off switch for a predetermined time interval after a launch of the vehicle from the aircraft.

14. A vehicle configured to launch from an aircraft, the vehicle comprising:
an engine;
a first autonomous flight termination system for terminating a flight of the vehicle after the vehicle is launched from an aircraft, the autonomous flight termination system including
a first global positioning system (GPS) receiver for determining a position of the vehicle during the vehicle flight relative to the Earth;
a first termination unit selected from a first cut-off switch connected to terminate the vehicle flight when actuated, and a first switch connected to an explosive on the vehicle;
a system controller for receiving a first signal from the aircraft indicating separation of the vehicle from the aircraft and a second signal from the GPS receiver to calculate an actual vehicle trajectory, and for sending a third signal to actuate the first termination unit to terminate the flight of the vehicle in response to determining the actual vehicle trajectory is outside safety bounds of a mission-planned flight trajectory for the vehicle; and
a failsafe controller connected to receive operational data of the system controller, the failsafe controller connected to actuate the first termination unit to terminate the vehicle flight in response to the operational data indicating the system controller is in an error state.

15. A method for terminating a vehicle flight after the vehicle is launched from an aircraft, the method comprising:
determining a position of the vehicle during the vehicle flight relative to the Earth with a global positioning system (GPS) receiver;
receiving by a system controller a first signal from the aircraft indicating separation of the vehicle from the aircraft and a second signal from the GPS receiver to calculate an actual vehicle trajectory;
calculating an actual vehicle trajectory;
determining the actual vehicle trajectory is outside predetermined safety bounds of a mission planned flight trajectory for the vehicle;
in response to determining the actual vehicle trajectory is outside predetermined safety bounds of the mission planned flight trajectory for the vehicle, sending a third signal from the system controller to actuate a termination unit to terminate the flight of the vehicle;
receiving operational data of the system controller by a failsafe controller;
determining the system controller is in an error state based on the operational data; and
actuating the termination unit to terminate the vehicle flight in response to the operational data indicating the system controller is in the error state.

16. The method of claim 15, wherein the termination unit is selected as a cut-off switch, and wherein terminating the flight of the vehicle includes actuating the cut-off switch to cut off fuel flow to a power plant of the vehicle.

17. The method of claim 15, wherein the termination unit is selected as a first switch, and wherein terminating the flight of the vehicle includes actuating the first switch to detonate an explosive on the vehicle.

18. The method of claim 15, wherein receiving operational data of the system controller by a failsafe controller includes receiving data indicating a clock failure of the system controller.

19. The method of claim 15, further comprising initially separating the vehicle from the aircraft.

20. The method of claim 19, wherein separating the vehicle from the aircraft includes providing a delay of a predetermined time interval before terminating the flight of the vehicle.

* * * * *